United States Patent
Leon Esquivel

(10) Patent No.: US 9,845,120 B1
(45) Date of Patent: Dec. 19, 2017

(54) ANTI ROLLOVER AUTOMOTIVE CHASSIS AND STABILIZER

(71) Applicant: Edgar Hosiel Leon Esquivel, Storm Lake, IA (US)

(72) Inventor: Edgar Hosiel Leon Esquivel, Storm Lake, IA (US)

( * ) Notice: Subject to any disclaimer, the term of this patent is extended or adjusted under 35 U.S.C. 154(b) by 0 days.

(21) Appl. No.: 15/399,355

(22) Filed: Jan. 5, 2017

(30) Foreign Application Priority Data

Jun. 13, 2016 (MX) .................. MX/U/2016/000241

(51) Int. Cl.
*B60R 21/00* (2006.01)
*B62D 37/04* (2006.01)
*B60R 21/13* (2006.01)

(52) U.S. Cl.
CPC .............. *B62D 37/04* (2013.01); *B60R 21/13* (2013.01); *B60R 2021/0018* (2013.01); *B60Y 2306/01* (2013.01)

(58) Field of Classification Search
CPC ......... B60R 3/002; B60R 21/00; B60R 19/40; B60R 2021/0018
USPC ........................... 280/5.507, 5.513, 755, 797
See application file for complete search history.

(56) References Cited

U.S. PATENT DOCUMENTS

| | | | | |
|---|---|---|---|---|
| 6,394,738 | B1* | 5/2002 | Springer | B62D 49/08 187/232 |
| 6,619,672 | B2* | 9/2003 | Charaudeau | B60G 17/0157 280/5.506 |
| 7,607,695 | B2* | 10/2009 | Moulene | B60G 21/007 280/5.507 |
| 7,673,902 | B2* | 3/2010 | Jayasuriya | B60R 3/002 280/755 |
| 2006/0175785 | A1* | 8/2006 | Hamm | B60G 7/006 280/124.106 |
| 2008/0122209 | A1* | 5/2008 | Jayasuriya | B62D 49/08 280/755 |
| 2009/0152940 | A1* | 6/2009 | Mercier | B60T 8/1706 303/113.2 |
| 2015/0353150 | A1* | 12/2015 | Ursich | B62D 37/04 280/755 |

* cited by examiner

*Primary Examiner* — Toan To
(74) *Attorney, Agent, or Firm* — Vander Velden Law Firm, LLC

(57) ABSTRACT

An automotive chassis which has an H-shaped base mounted to a vehicle. An electric motor having a rotatable axis is mounted to a metal floor situated in a square, box-shaped center in the H-shaped base. A metal disk is coupled to the axis of the electric motor, and rotation of the axis of the electric motor causes rotation of the metal disk, creating a centrifugal force that stabilizes the vehicle.

4 Claims, 2 Drawing Sheets

ANTI ROLLOVER AUTOMOTIVE CHASSIS AND STABILIZER

CROSS-REFERENCE TO RELATED APPLICATIONS

This application claims priority to Mexican Patent Application No. MX/u/2016/000241, filed on Jun. 13, 2016, the entirety of which is hereby incorporated herein by reference.

BACKGROUND

In the present time, motor vehicles are vulnerable to overturning in the event of an accident, wind gusts, or an erroneous maneuver of the driver. As a result, the probability of serious injury or death exists as the vehicle overturns violently and passengers are projected out of the vehicle by the forces of inertia.

To correct the natural behavior of a vehicle in an accident such as a crash, wind gust, or a bad maneuver of the driver, a new chassis with anti-roll system and stabilizer for private and commercial vehicles is disclosed, with the purpose of decreasing the death or serious injury to the passengers and the drivers who maneuver them.

DETAILED DESCRIPTION

Figure 1:
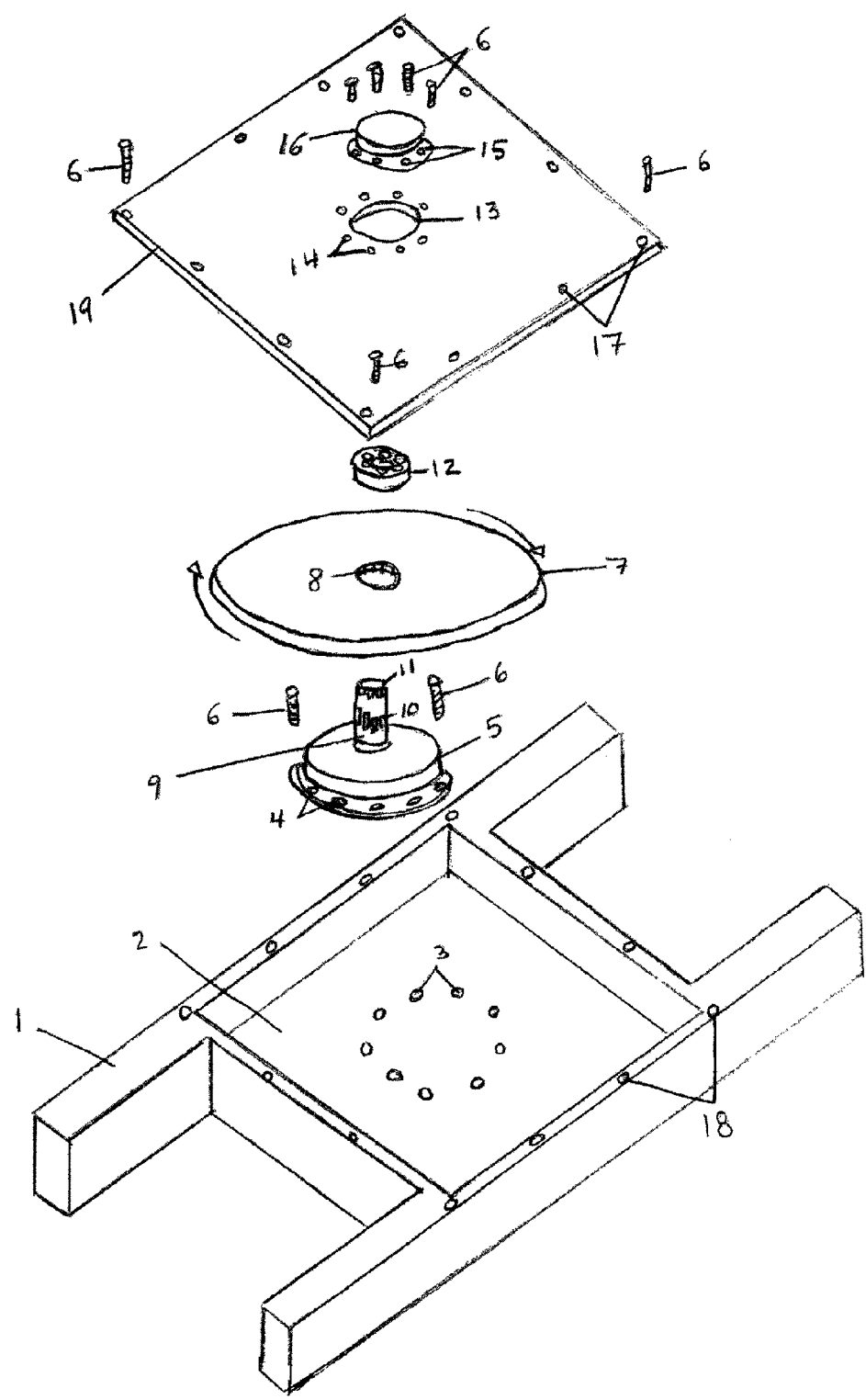
FIG. 1 illustrates an anti rollover automotive chassis and stabilizer.
Figure 2:
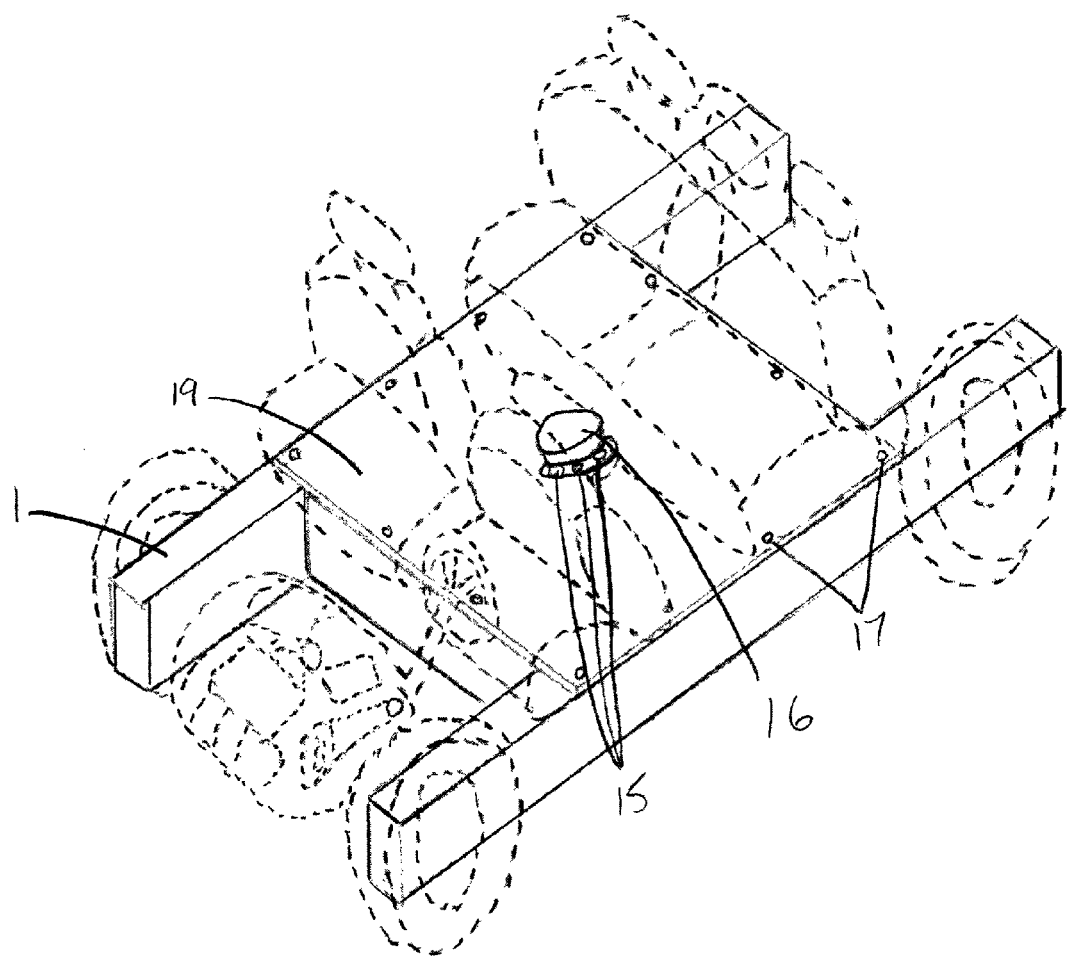
FIG. 2 illustrates a vehicle fitted with the assembled chassis.

Referring to FIG. 1, an anti-rollover automotive chassis comprises the following components:

Reference number 1 refers to an "H" shaped metal part with a square, box-shaped center, which is the main base;
Reference number 2 refers to a square metal floor;
Reference number 3 refers to threaded holes in square metal floor 2;
Reference number 4 refers to smooth holes in electric motor 5;
Reference number 5 refers to an electric motor;
Reference number 6 refers to a screw;
Reference number 7 refers to a metallic disk;
Reference number 8 refers to a center hole of metallic disk 7;
Reference number 9 refers to an axis of electric motor 5;
Reference number 10 refers to slots in axis 9 of electric motor 5;
Reference number 11 refers to slots in axis 9 of electric motor 5;
Reference number 12 refers to a bearing;
Reference number 13 refers to a central hole in metallic cover 19;
Reference number 14 refers to threaded holes in metallic cover 19;
Reference number 15 refers to orifices in metallic round cap 16;
Reference number 16 refers to a metallic round cap;
Reference number 17 refers to smooth holes of metallic cover 19;
Reference number 18 refers to threaded holes in main base 1;
Reference number 19 refers to a metallic cover which is the main lid.

The stabilizing, anti-rollover and multiple-use automotive chassis prevents a private or commercial automotive vehicle from turning over, and stabilizes against impact, wind blasts and poor maneuvering of the driver. An "H"-shaped metal part (1) with a box-shaped square center and a metal floor (2) in the lower part is coupled with an electric motor (5) placed over the threaded holes (3), and the electric motor (5) is united with nine screws (6) through the holes (4) and (3), leaving the electric motor (5) firmly in the center of the metal floor (2). A metal disk (7) to be rotated at 5,200 to 7,000 rpm (revolutions per minute) by the electric motor (5) produces stability and equilibrium by the centrifugal force, and is positioned from its center hole (8) on the axis (9) of the electric motor (5) by fixing it in the pressurized slots (10). On the upper part of the axis (9) is placed a bearing (12) which is fixed in the pressure slots (11), and a metal cover (19) is placed above the chassis (1). The metal cover (19) is connected by the holes (17) and threaded holes (18) with 12 screws (6) for covering the components. The bearing (12) is positioned in the hole (13) of the metal cover (19), giving it more stability and support to the axis (9). Finally, the bearing (12) is covered with the round metal cap (16) joining it with the holes (15) and the threaded holes (14) with eight screws (6).

As we can see, the already assembled invention will work for what was created, to avoid the overturning of automotive vehicles thanks to the rotating and centrifugal forces that it exerts on any platform in which it is placed.

The invention claimed is:

1. An automotive chassis for preventing a vehicle from being overturned comprising:
    an H-shaped base mounted to the vehicle, wherein the H-shaped base comprises a square, box-shaped center having a metal floor situated in the box-shaped center;
    an electric motor coupled to the metal floor, wherein the electric motor comprises a rotatable axis; and
    a disk coupled to the axis of the electric motor;
    wherein the disk is configured to rotate at 5,200 RPM to 7,000 RPM creating a centrifugal force; and
    wherein the centrifugal force stabilizes the vehicle.

2. The automotive chassis of claim 1 further comprising a pressure bearing coupled to the axis of the electric motor.

3. The automotive chassis of claim 2 further comprising a cover coupled to the H-shaped base, wherein the cover comprises a central hole, and the bearing passes through the central hole.

4. The automotive chassis of claim 2 further comprising a cap coupled to the bearing and configured to cover the bearing.

\* \* \* \* \*